Aug. 19, 1941.  E. WILDHABER  2,252,743
METHOD OF AND MACHINE FOR PRODUCING GEARS
Filed Jan. 3 1940  12 Sheets-Sheet 4

Inventor
ERNEST WILDHABER
By
B. E. Shlesinger
Attorney

Aug. 19, 1941.  E. WILDHABER  2,252,743
METHOD OF AND MACHINE FOR PRODUCING GEARS
Filed Jan. 3, 1940  12 Sheets-Sheet 5

Inventor
ERNEST WILDHABER

By
Attorney

Inventor
ERNEST WILDHABER

Aug. 19, 1941.  E. WILDHABER  2,252,743
METHOD OF AND MACHINE FOR PRODUCING GEARS
Filed Jan. 3, 1940  12 Sheets-Sheet 7

Inventor
ERNEST WILDHABER
By
B. E. Schlesinger
Attorney

Inventor
ERNEST WILDHABER

Aug. 19, 1941.  E. WILDHABER  2,252,743
METHOD OF AND MACHINE FOR PRODUCING GEARS
Filed Jan. 3, 1940  12 Sheets-Sheet 10

Inventor
ERNEST WILDHABER
By
Attorney

Aug. 19, 1941.   E. WILDHABER   2,252,743
METHOD OF AND MACHINE FOR PRODUCING GEARS
Filed Jan. 3, 1940   12 Sheets-Sheet 11

Inventor
ERNEST WILDHABER
Attorney

Aug. 19, 1941.  E. WILDHABER  2,252,743
METHOD OF AND MACHINE FOR PRODUCING GEARS
Filed Jan. 3, 1940  12 Sheets-Sheet 12

Inventor
ERNEST WILDHABER
By
[signature]
Attorney

Patented Aug. 19, 1941

2,252,743

UNITED STATES PATENT OFFICE 2,252,743

METHOD OF AND MACHINE FOR PRODUCING GEARS

Ernest Wildhaber, Brighton, N. Y., assignor to Gleason Works, Rochester, N. Y., a corporation of New York Application January 3, 1940, Serial No. 312,312

23 Claims. (Cl. 51—52)

The present invention relates to the production of gears and particularly to the grinding of longitudinally curved tooth gears such as spiral bevel and hypoid gears in a generating operation.

A primary object of the invention is to provide a method and machine for the generating-grinding of spiral bevel and hypoid gears which is faster than the methods and machines employed heretofore for that purpose.

Another object of the invention is to provide a gear grinding machine of the generating type for producing tapered gears which will be simplified in construction and which may be built at less cost than previous types of such machines.

A further object of the invention is to provide a gear grinding machine of the character described which, while fast in operation, is nevertheless suited for use in a jobbing shop where tapered gears of a wide variety of tooth numbers have to be ground in small lots.

Still another object of the invention is to provide a mechanism for oscillating the cradle of a tapered gear generating machine, but which may be used also for oscillating or reciprocating any slide, and which will effect constant speed movement of the cradle or slide in one direction and a quick return movement in the opposite direction.

Other objects of the invention will be apparent hereinafter from the specification and from the recital of the appended claims.

In a machine built according to the present invention, as in the previously known types of machines for the generating-grinding of spiral bevel and hypoid gears, either the grinding wheel or the gear to be ground may be mounted on an oscillatory cradle and the generating operation is effected by rotating the wheel in engagement with the work while rotating the cradle and work on their respective axes in timed relation. With previous types of machines, however, at the end of a roll in one direction, the drive to the cradle and the work were reversed and during or at the end of the return roll, the wheel was withdrawn from engagement with the work and the work indexed. Then the wheel was fed back into engagement with the gear and the cycle began anew. The mechanism required to effect automatic indexing of the work in time with the cycle of operation of the machine was, of course, complicated. Moreover, the time required for indexing was, of course, time lost from the operating cycle of the machine. Furthermore, when a notched-plate type index mechanism was employed, different notched plates had to be used for different numbers of teeth to be ground. Such plates are, of course, expensive and it required time to change them for different jobs.

With the present invention, intermittent indexing of the work is eliminated. The gear to be ground is rotated continuously at a constant speed in one direction throughout the whole grinding operation. The cradle, however, is still oscillated back and forth. Grinding is effected while the cradle is moving in one direction. The continuous rotation of the work operates, during the return roll of the cradle, to index the blank automatically. No index mechanism is required. The wheel is withdrawn from engagement with the blank at the end of the grinding roll of the cradle and is returned into engagement with the work after the return movement of the cradle has been completed. The gearing for driving the work and cradle are preferably so selected that the work will rotate during a cycle of the cradle movement through the angular distance of a number of tooth spaces which is prime to the total number of tooth spaces in the gear being ground. Thus the work may be automatically indexed for the grinding of all of the tooth spaces of the gear.

Through the continuous rotation of the work, the necessity for any special indexing mechanism is obviated and the gear grinding machine is simplified. Moreover, the elimination of the indexing operation permits of faster grinding. Still further, all the gears in the machine may be driven at a constant speed and without reversal.

For most efficient operation, the cradle is oscillated by a new form of quick return mechanism which is adapted to move the cradle at a uniform velocity during grinding and return it at fast speed when the wheel is clear of the work. This mechanism comprises a rotary plate having a cam eccentrically mounted thereon to rotate with the plate. The plate is driven continuously in one direction in time with the rotation of the work. The cam engages in a straight sided slot of a guide member that is secured to the cradle at one side of the cradle axis. The cam is adjustable radially of the axis of the plate for different amounts of throw to control the amount of oscillation of the cradle. The guide member is adjustably mounted on the cradle so that the center line of its guide slot may be adjusted to be radial or non-radial of the axis of the cradle. The non-radial arrangement of the slot permits of control of the profile shape of the gear being cut as will appear more fully hereinafter. The cam is made with portions of its periphery of cycloidal form so that as the plate rotates in one direction it will impart, as desired, uniform motion to the guide member and cradle for grinding.

Figure 1:
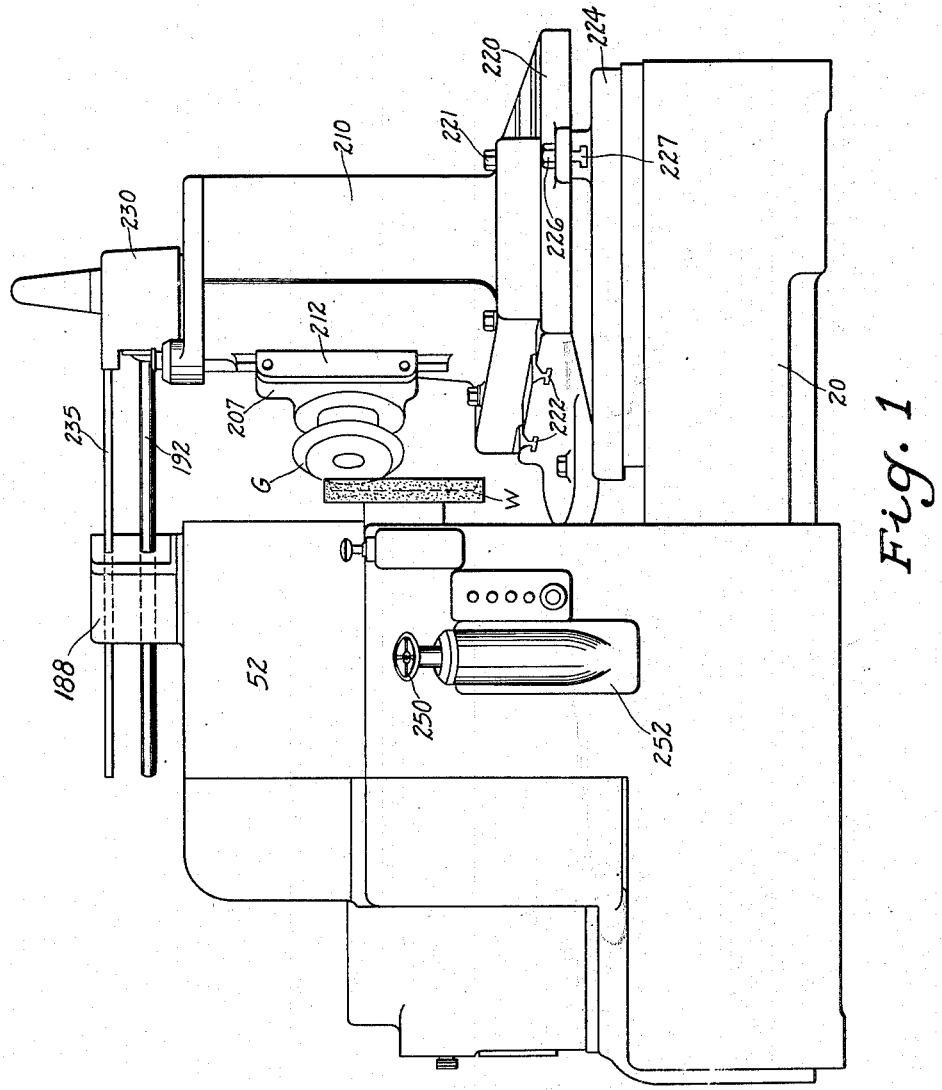
Fig. 1 is a side elevation partly in perspective of a spiral bevel and hypoid gear grinding machine built according to one embodiment of this invention.

Referring now to the drawings by numerals of reference, 20 denotes the base of the machine, W designates the grinding wheel and G the gear which is to be ground. The grinding wheel W is a rotary annular wheel and in the embodiment shown has active side surfaces 23 and 23' of straight profile and positive pressure angle. It is secured in any suitable manner, as by means of the nut 21 (Fig. 4) to the wheel spindle 22. The gear G is secured in any suitable manner to the work spindle 24 (Fig. 9) of the machine.

The wheel spindle 22 is journaled on anti-friction bearings 25 and 26, (Figs. 4 and 8) in a sleeve 27. The sleeve 27 is mounted on roller bearings in a carrier 28 for adjustment and sliding movement in the direction of the axis of the wheel spindle 22. The mounting for the sleeve 27 comprises three angularly spaced sets of roller bearings which are designated at 30, 31 and 32 in Fig. 8. Each set of roller bearings comprises a forward bearing and a rear bearing. One of these sets 31 is shown in Fig. 4. The carrier 28 is made in two parts for convenience of assembly and the two parts are bolted together by screws 34 as clearly shown in Figs. 3 and 8. The carrier 28 is mounted in the cradle 37 of the machine for pivotal adjustment about the axis X of a stud or trunnion 35 (Figs. 3 and 4) which is secured in the cradle 37 and which extends in a direction parallel to the axes of both the wheel spindle 22 and the cradle 37.

Figure 3:
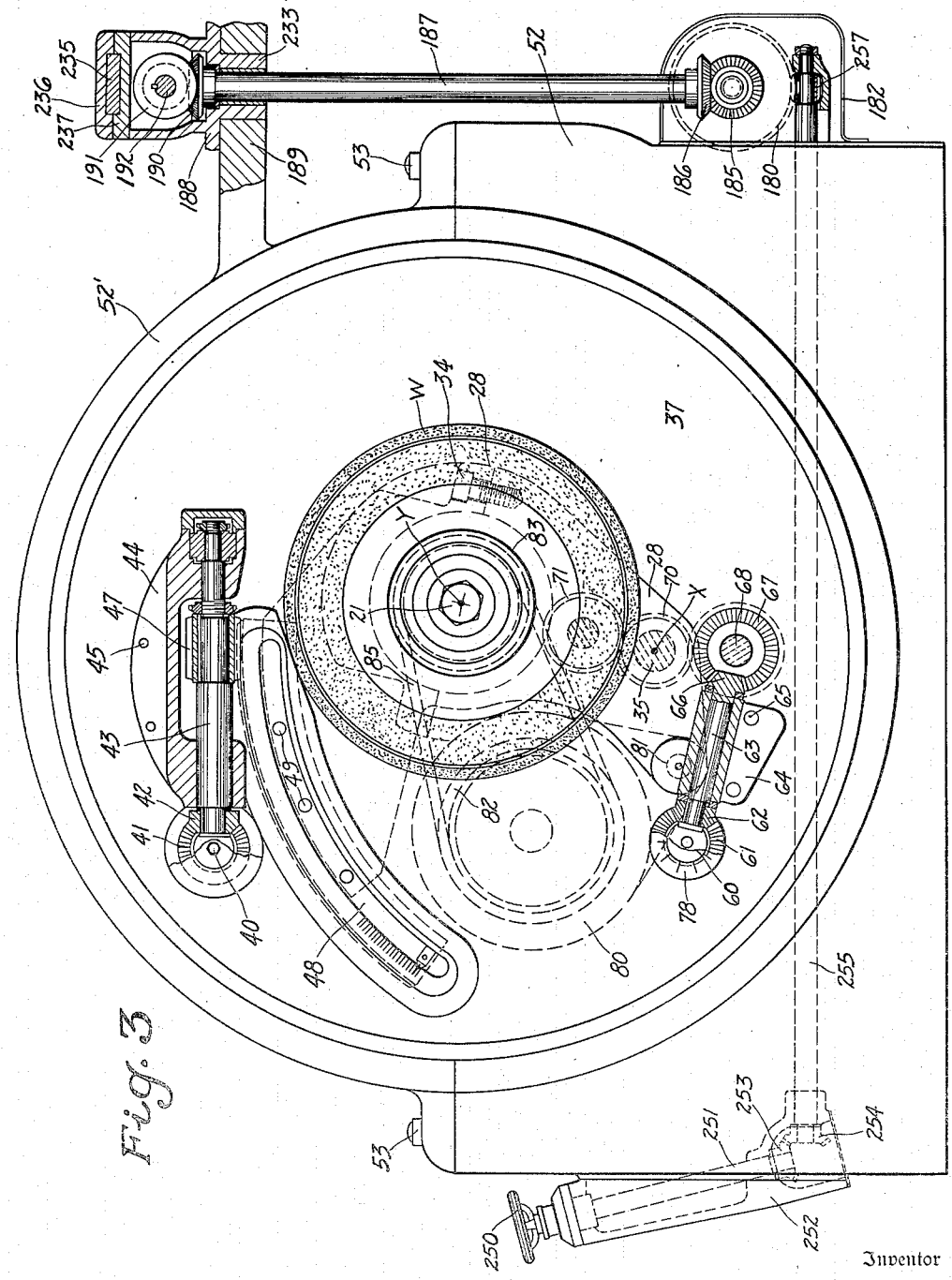
Fig. 3 is an elevational view looking at the front of the cradle of the machine, parts being broken away and shown in section.
Figure 4:
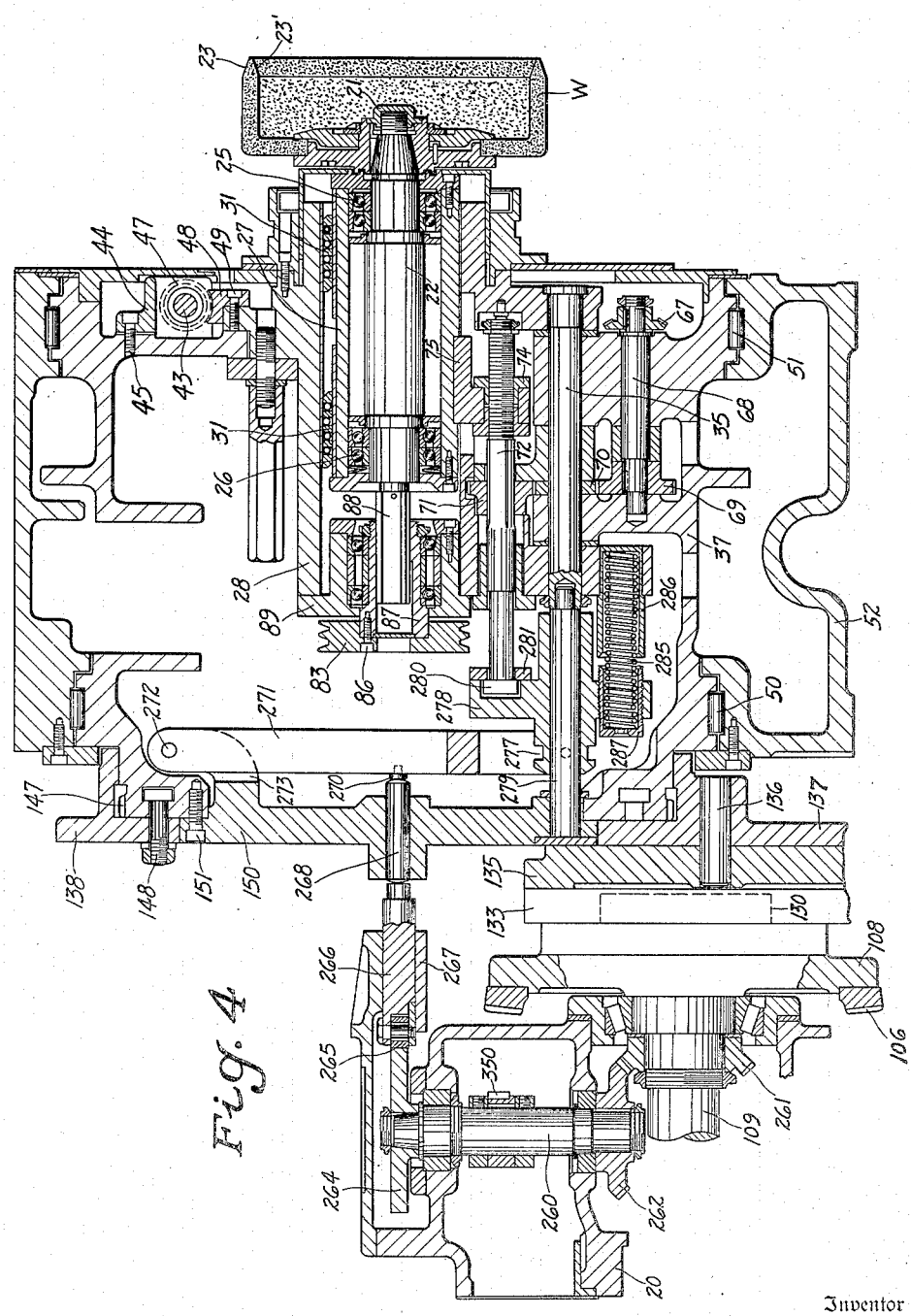
Fig. 4 is a vertical sectional view through the cradle and showing, also, parts of the cradle oscillating mechanism and of the wheel feed mechanism.

Adjustment of the carrier 28 in the cradle 37 is effected by rotation of a short shaft 40 (Fig. 3). This shaft is journaled in the cradle 37 and carries a bevel gear 41 at its rear end which meshes with a bevel gear 42 that is secured to a shaft 43. The shaft 43 is suitably journaled in the bracket 44 which is secured by screws 45 to the cradle 37. A worm 47 is keyed to the shaft 43. This worm meshes with a wormwheel segment 48 which is secured by means of screws 49 to the upper part of the carrier 28. The shaft 40 is manually rotatable to effect angular adjustment of the carrier 28 and of the wheel W journaled therein.

The cradle 37 is a full circular cradle. It is mounted on spaced roller bearings 50 and 51 in a split housing 52. The upper part or cap portion 52' of this housing is secured to the lower portion thereof by screws 53. The lower portion of the housing is secured to or is integral with the base 20 of the machine.

Figure 8:
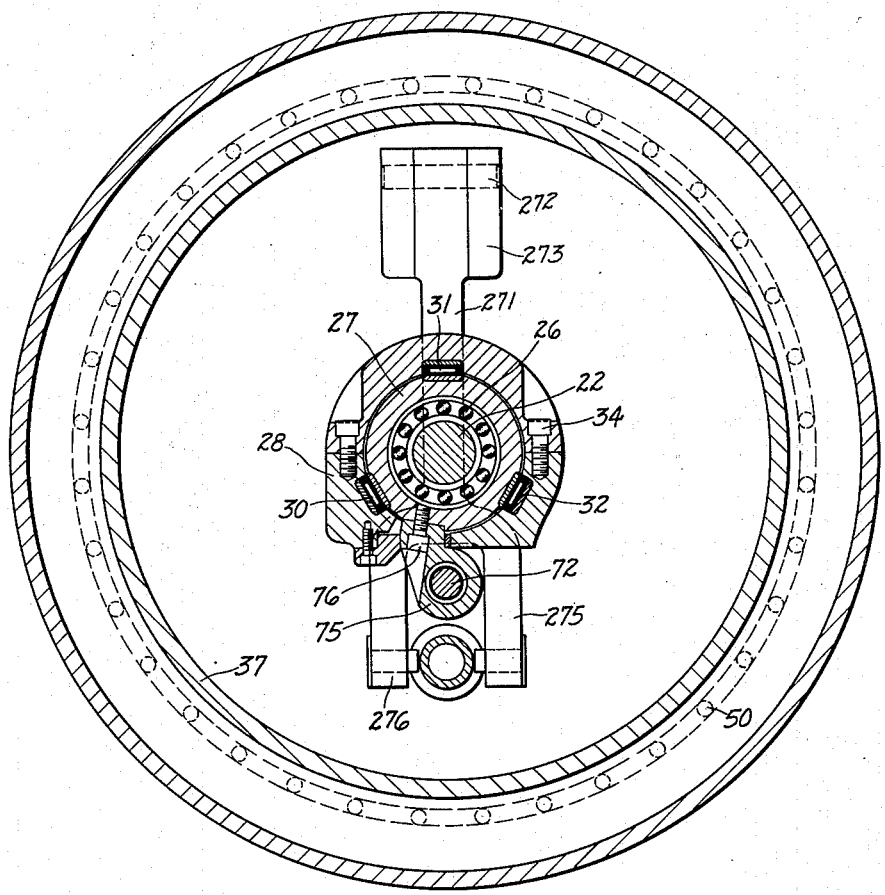
Fig. 8 is a sectional view in a plane at right angles to the cradle axis showing details of the wheel feed mechanism.

The grinding wheel W may be dressed by any suitable dressing mechanism. To compensate for wear of the wheel W, the sleeve 27 is adjusted axially in the carrier 28. This adjustment may be effected by rotation of a short shaft 60 (Fig. 3) which is journaled in the cradle 37 and to which is secured a bevel gear 61 that meshes with a bevel gear 62. The bevel gear 62 is secured to a shaft 63 which is journaled in a bracket 64 that is fastened by screws 65 to the cradle 37. The shaft 63 carries a bevel pinion 66 which meshes with a bevel gear 67 that is keyed to a shaft 68 (Fig. 4) which is suitably journaled in the cradle 37. Keyed to the rear end of the shaft 68 is a spur gear 69. This spur gear 69 meshes with a spur gear 70 that is journaled on the stud 35. The spur gear 70 meshes with the spur gear 71 which is keyed to a shaft 72. The shaft 72 is journaled in the carrier 28 and is threaded at its forward end to engage in a nut 74 that is secured in a lug 75 (Figs. 4 and 8). The lug 75 is fastened by screws 76 to the sleeve 27.

It will be seen, then, that as the shaft 60 is rotated, the screw shaft 72 will revolve in the nut 74 to move the sleeve 27 axially in the carrier 28. To permit accurate adjustment of the axial position of the grinding wheel W, there is a knob secured to the forward end of the shaft 60 which has an index mark on it to read against a graduated dial 78 which is secured to the cradle 37.

During operation of the machine, the grinding wheel W is rotated continuously. It is driven from a motor 80 (Figs. 3 and 10) which is pivotally mounted upon a stud 81 that is secured in the carrier 28. The armature shaft of the motor carries a pulley 82. This pulley drives a pulley 83 (Figs. 3 and 4) through a belt 85. The pulley 83 is secured by screws 86 to a sleeve 87 that has a sliding splined connection with the reduced inner end portion 88 of the wheel spindle 22. The sleeve 87 is journaled on anti-friction bearings in a bracket 89 which is suitably secured to the rear end of the carrier 28.

During operation of the machine, the cradle 37 is oscillated back and forth, grinding taking place, as already described, on movement of the cradle in one direction and the wheel being withdrawn from the grinding position during the return roll of the cradle 37. The drive to the cradle 37 is derived from a motor 90 (Fig. 10) which is mounted in any convenient position on the base of the machine. A bevel pinion 91, which is secured to the armature shaft of this motor, meshes with a bevel gear 92 that is keyed to a shaft 93 which is journaled in the base 28 of the machine. The shaft 93 carries a bevel pinion 94 which meshes with a bevel gear 95 (Figs. 10 and 7) that is keyed to a shaft 96 which is journaled in the base 20 of the machine.

Fastened to the shaft 96 is a spur gear 97. This spur gear meshes with a spur gear 98 that is keyed to a shaft 99 which is journaled in the base of the machine parallel to the shaft 96. Keyed to the shaft 99 at its forward end is a bevel pinion 100. This bevel pinion meshes with a bevel gear 101 which is secured to a sleeve 102 that is keyed to a shaft 103.

Figure 7:
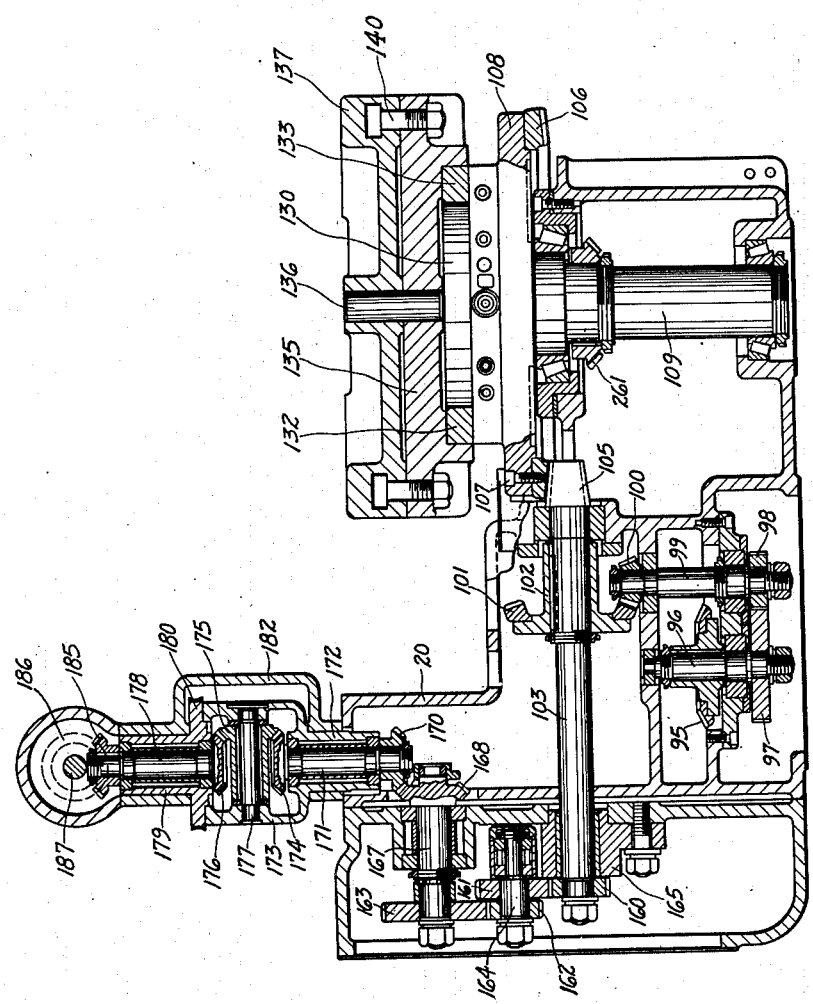
Fig. 7 is a fragmentary horizontal sectional view through the base of the machine showing parts of the drive to the cradle oscillating mechanism and of the gearing which drives the work spindle.
Figure 10:
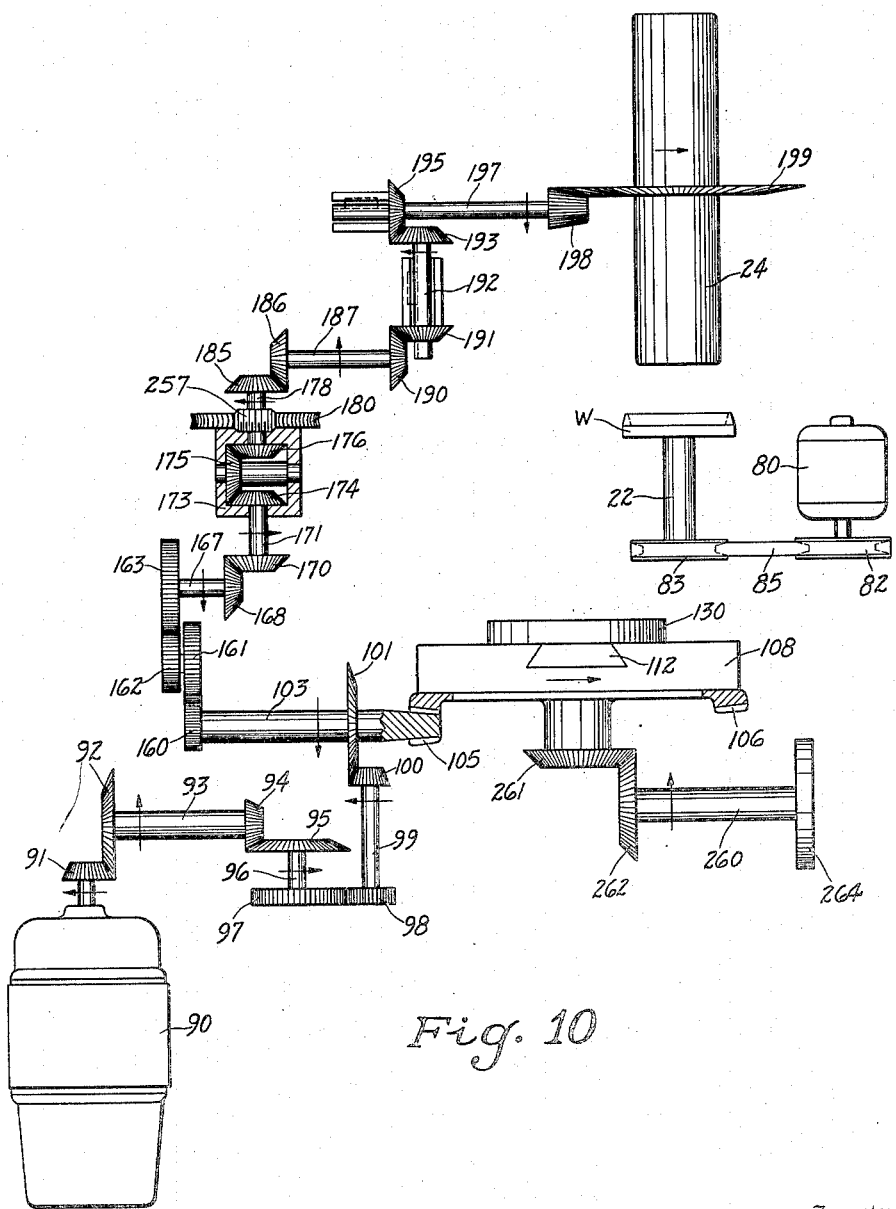
Fig. 10 is a diagrammatic view showing the way in which the various parts of the gear grinding machine are geared together to perform their functions.

The shaft 103 is journaled in the base of the machine at right angles to the shaft 99 and has a bevel pinion 105 formed integral with it. This pinion meshes with a bevel gear 106 (Figs. 4, 7 and 10). The gear 106 is secured by screws 107 to a plate 108.

Figure 6:
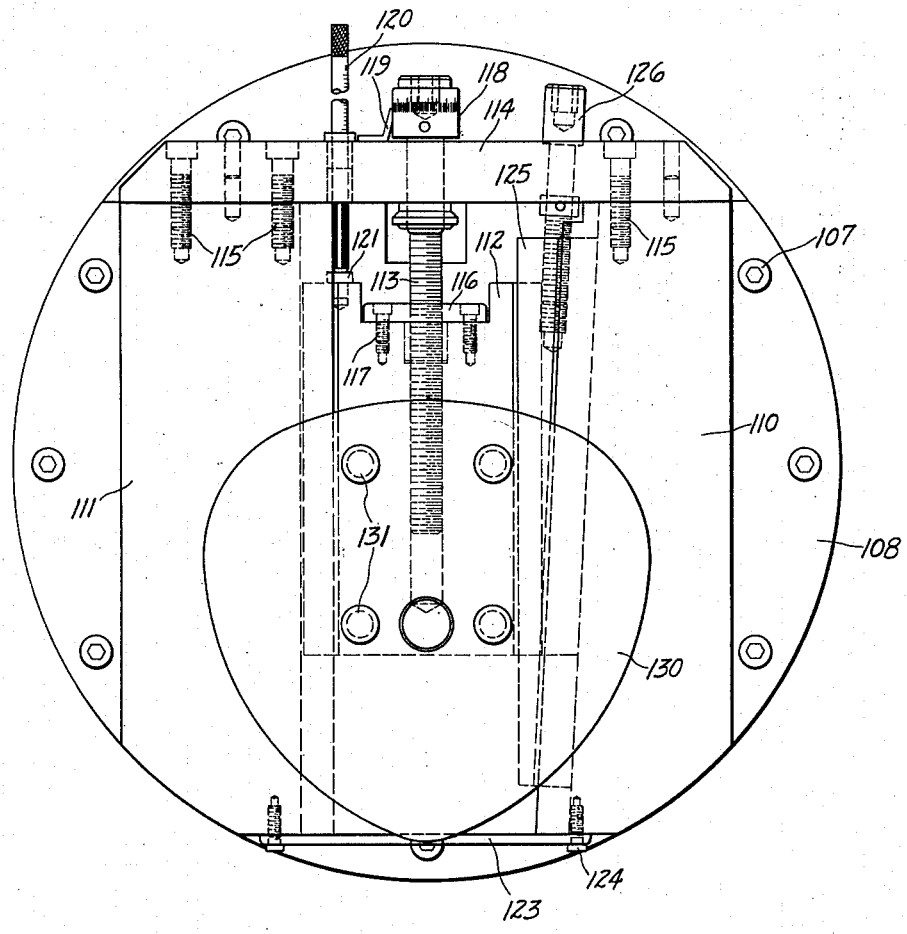
Fig. 6 is an enlarged view of the cradle oscillating cam and plate.

The plate 108 is provided on its forward side with guide members 110 and 111 (Fig. 6). The guide-members 110 and 111 form the sides of a dove-tailed guide-slot in which is mounted a rectilinearly adjustable slide 112. Adjustment of slide 112 is effected by rotation of the screw shaft 113. This shaft is journaled in a strap-member 114 which is secured by screws 115 to the guide members 110 and 111. The screw shaft 113 threads into a nut 116 which is secured by screws 117 to the slide 112. Adjustment of the slide 112 may be made by rotation of the graduated knob 118 which is secured to the shaft 113. The graduations of knob 118 read against a pointer 119 that is secured to the strap-member 114. Thus adjustment of the slide 112 in the guides 110 and 111 may be made accurately. A stop pin 120, that is threaded into the strap 114 and that engages a hard tip 121 which is secured in the slide 112, serves to limit adjustment of the slide in one direction. A strap member 123 which is secured to the lower ends of the guides 110 and 111 by screws 124 serves to limit adjustment of the slide 112 in the opposite direction. A tapered gib 125, which is interposed between one side of the slide 112 and the adjacent side of the guide member 110 serves to take up wear. This gib may be adjusted by means of a screw shaft 126 that is journaled in the strap member 114 and that threads into the gib 125.

A cam member 130 is detachably secured to the slide 112 by screws 131. The cam member 130 is shaped, as will be described more fully hereinafter, to produce movement of the cradle 37 at a uniform speed in one direction for grinding and a quick return motion in the opposite direction when the wheel is withdrawn from engagement with the work. The cam 130 engages in the slot formed between two parallel straight guides 132 and 133 (Figs. 4, 5 and 7) which are secured by screws 134 to a plate 135. The plate 135 is mounted on a stud 136 that is secured in the fan-tail extension 137 of a ring-like member 138 that is adjustably secured to the cradle 37. The plate 135 is adjustable angularly about the axis of the stud 136 and is held in any position of its adjustment by bolts 140 which pass through arcuate slots 141 formed in the extension 137 of the ring-member 138. The slots 141 are concentric of the axis of the stud 136.

As stated, the ring-like member 138 is secured to the cradle 37. Hence, as the shaft 109, plate 108, and cam 130 rotate, an oscillatory motion will be imparted through the plate 135 and ring member 138 to the cradle 37, to produce the generating and return rolls of the cradle 37.

Figure 5:
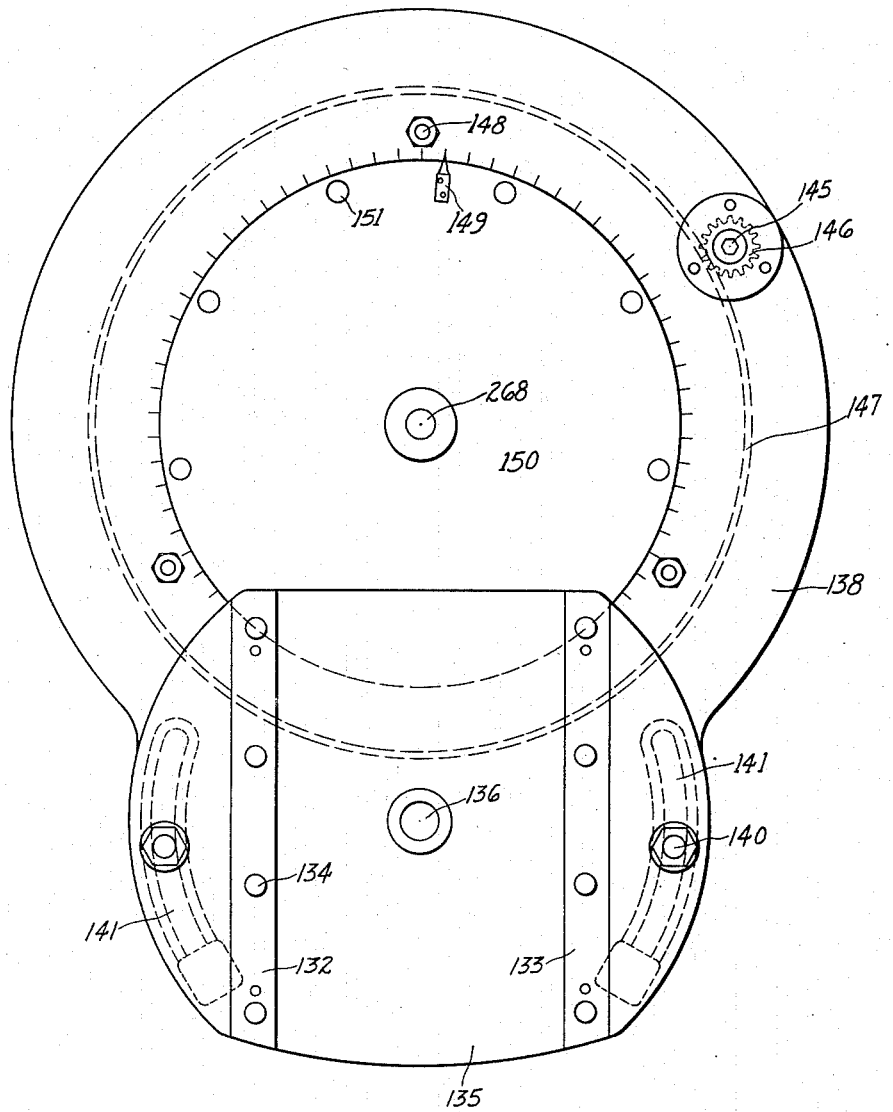
Fig. 5 is a rear elevational view of the cradle on a somewhat enlarged scale.

The cradle 37 is adjustable angularly with reference to the ring member 138. This adjustment is about the axis of the cradle 37 and may be effected by rotation of the shaft 145 (Fig. 5). This shaft is journaled in the ring-member 138 and carries a spur pinion 146 that meshes with a spur gear 147 (Fig. 4) which is integral with the cradle 37. The cradle 37 and ring member are secured together after adjustment of the cradle 37 by T-bolts 148 whose heads engage in a circular slot formed in the cradle 37 concentric to the axis of the cradle 37. When the bolts 148 are loosened, the shaft 145 may be rotated to rotate the cradle relative to the ring-member 138 which will be held stationary through engagement of the cam 130 with the guide 133. Thus the cradle 37 may be adjusted angularly in its bearings. This adjustment in conjunction with the angular adjustment of the carrier 28 (Fig. 3) already described serves to position the grinding wheel W for grinding teeth of the desired spiral angle on the gear which is to be ground. The angular adjustment of the carrier serves to position the wheel W at the correct radial distance from the axis of the cradle 37 and the angular adjustment of the cradle 37 locates the wheel W at the correct angular position about the axis of the crown gear or other basic generating gear represented by the axis of the cradle 37. The ring member 138 is provided with suitable graduations as indicated in Fig. 5, that read against a pointer 149 so that the angular adjustment of the cradle 37 may be made accurately. The pointer 149 is secured to a plate 150 which is secured by screws 151 (Fig. 4) to the cradle 37.

As the cradle 37 oscillates back and forth, the work spindle 24, as already stated, rotates continuously in one direction at a constant speed. The uniform rotation of the work G operates in conjunction with the uniform movement of the cradle 37 during grinding to generate tooth profiles on the gear teeth capable of transmitting uniform motion. The rotation of the work G during the return movement of the cradle 37 operates, as already indicated, to index the work G.

The work spindle 24 is driven from the shaft 103 (Figs. 7 and 10) in time with the rotation of the cam 130. Keyed to the shaft 103 at its outer end is a spur gear 160. The spur gear 160 forms one of a set of compound change gears of which the other members are denoted at 161, 162, and 163. The spur gears 161 and 162 are journaled on a stud 164 which is mounted in a quadrant 165 which may be of usual construction. The spur gear 163 is keyed to a shaft 167 which has formed integral with it a bevel gear 168. The bevel gear 168 meshes with a bevel gear 170 that is keyed to a shaft 171. The shaft 171 is journaled in a sleeve 172 projecting from one side of a differential housing 173 and has integral with it a bevel gear 174 which constitutes one of the side gears of a bevel gear differential comprising the gear 174, the pinion 175 and the side gear 176. The pinion 175 is keyed to a shaft 177 which is journaled in the differential housing 173. The side gear 176 is integral with a shaft 178 that is journaled in a sleeve 179. The sleeve 179 is formed integral with a worm wheel 180. The worm wheel 180 is fastened in any suitable manner to one side of the differential housing 173. The differential housing 173 is journaled by means of the sleeves 179 and 172 in a bracket 182 (Figs. 7 and 3) which is secured to one side of the cradle housing 52.

Keyed to the forward end of the shaft 178 is a bevel gear 185. The bevel gear 185 meshes with a bevel gear 186 which is integral with the vertical shaft 187. The shaft 187 is journaled at its lower end in the bracket 182 and at its upper end in a swivel member 188. The swivel member 188 is journaled in the arm 189 which is integral with the cap portion 52' of the cradle housing 52.

Figure 9:
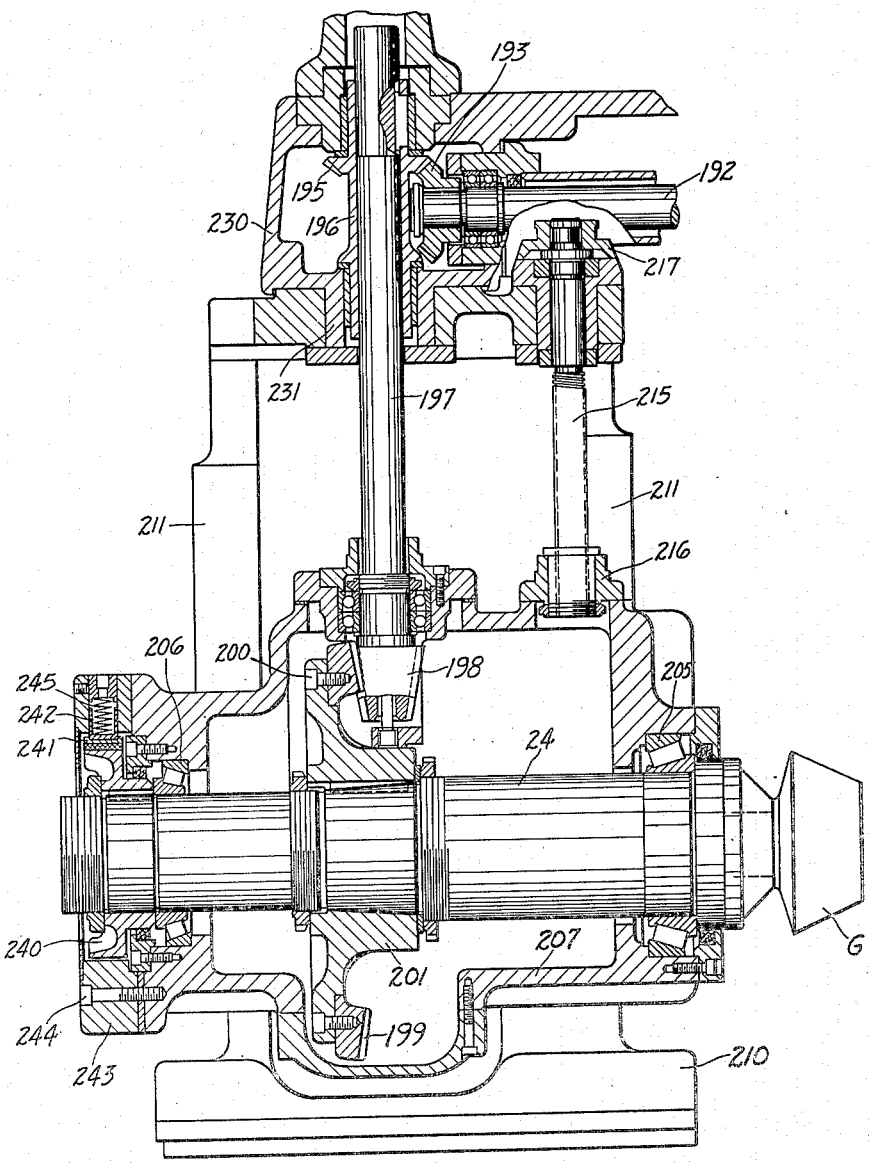
Fig. 9 is a sectional view through the work head of the machine and its supporting column and illustrating the mounting of the work spindle and parts of the drive thereto.

The shaft 187 carries at its upper end a bevel gear 190. This bevel gear meshes with a bevel gear 191 which is keyed to a shaft 192 that has a sliding engagement with the gear 191. Keyed to the shaft 192 at the end opposite to that which engages with the gear 191 is a bevel gear 193 (Figs. 9 and 10). This bevel gear meshes with a bevel gear 195 which is integral with a sleeve 196. Sleeve 196 has a sliding key connection with a vertical shaft 197. The shaft 197 carries at its lower end a hypoid pinion 198. The hypoid pinion 198 meshes with a hypoid gear 199. This gear is secured by screws 200 to a hub member 201 which is keyed to the work spindle 24 of the machine. Through the drive described, it will be seen that the work spindle 24 is rotated continuously in one direction in time with the rotation of the plate 108 which carries the cam 130 and which also rotates continuously in one direction.

Figure 2:
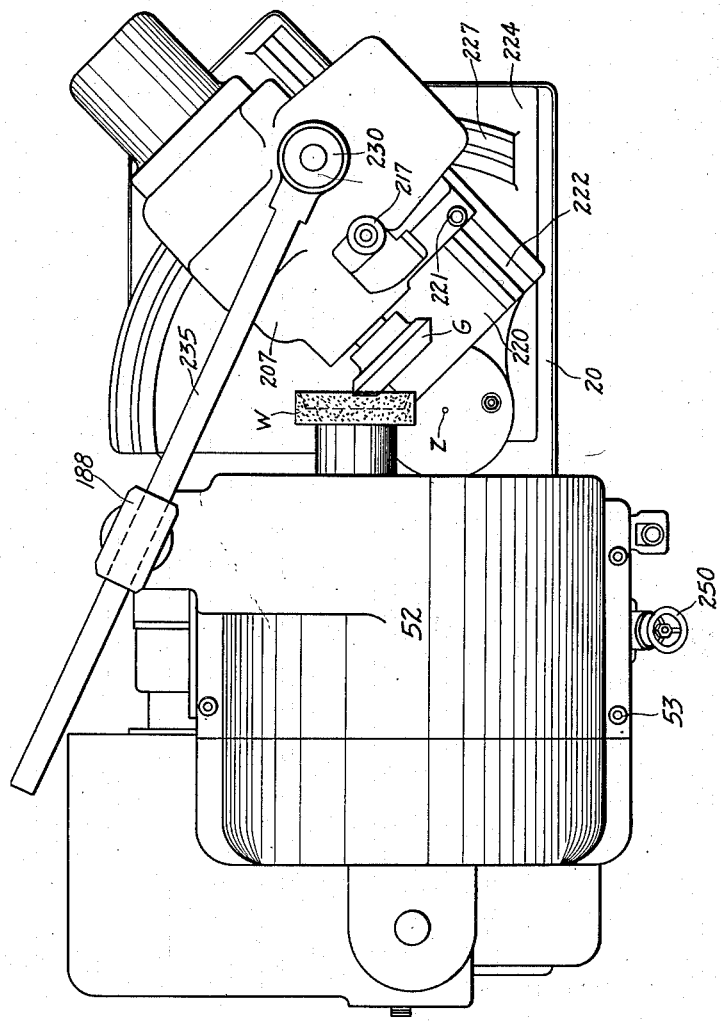
Fig. 2 is a plan view of this machine.

The work spindle 24 is journaled on anti-friction bearings 205 and 206 in a work head 207 (Figs. 1, 2 and 9) which is mounted for vertical adjustment on a column 210. The column 210 is provided with spaced ways 211 and the work head 207 slides on these ways. The work head 207 is held to the column by a gib 212. Adjustment of the work head 207 on the column 210 is effected by rotation of a screw shaft 215 which is journaled in the column 210 and which threads into a nut 216 which is suitably secured to the work head 207. This adjustment permits of positioning the work spindle 24 with its axis either intersecting or offset from the axis of the cradle 37. Thus either spiral bevel or hypoid gears and pinions may be ground upon this machine. A knob 217 having suitable graduations is secured to the screw shaft 215 to enable the work head 207 to be adjusted precisely. The sliding engagement of the shaft 197 with the sleeve 196 permits of maintaining the drive to the work spindle 24 in any adjusted position of the work head 207.

The column 210 is mounted on a swinging base 220 for adjustment in a direction axial of the work spindle 24. This adjustment is for the purpose of setting the work in accordance with the cone distance of the gear to be ground. The column 210 may be secured to the swinging base 220 after adjustment by T-bolts 221 which engage in elongated slots 222 formed in the upper face of the swinging base 220. The swinging base 220 is adjustable angularly on a sliding base 224. This angular adjustment is about an axis Z (Fig. 2) which intersects the axes of both the work spindle and the cradle. This adjustment is for the purpose of locating the work G in accordance with the root cone angle of the gear which is to be ground. The swinging base 220 is secured in any adjusted position on the sliding base 224 by T-bolts 226 which engage in an arcuate slot 227 that is formed in the sliding base 224 concentric of the axis Z. The sliding base 224 is movable on ways that are formed on the upper face of the base 20 of the machine and that extend in the direction of the axis of the cradle 37. Any suitable means, such as is ordinarily employed in the art may be used to move the sliding base 224 to and from operative position. When the sliding base 224 is in inoperative position sufficient room is provided to enable a completed gear to be taken off of the machine and a new gear chucked thereon without danger of interference between the work and the grinding wheel. The various adjustments of the work head, column, swinging base, and sliding base have not been described or illustrated in detail since these adjustments are common in machines for producing bevel gears.

It will be noted that the drive to the work spindle is an overhead drive through the telescoping shaft 192. This drive constitutes one of the features of the machine. Ordinarily in bevel gear cutting and grinding machines, the drive to the work spindle 24 is through a shaft concentric of the axis Z of adjustment of the swinging base 220. With the improved drive of the present machine, the drive to the work spindle 24 is simplified. A number of gears and shafts have been eliminated. This is a feature of prime advantage in a gear grinder. The fewer the number of gears in the train, the less the possibility that any backlash between the gears may effect the accuracy of grinding. Grinding is a precision operation and anything which will improve the precision operation of the grinding machine is of real advantage.

One end of the shaft 192 is journaled in a swivel member 230 (Figs. 1, 2 and 9) which is rotatably mounted on the column 210 and the other end of the shaft slides in the gear 195 which is journaled in the swivel member 188 (Fig. 3). The swivel member 230 has a sleeve portion 231 which is journaled in the top of the column 210. The swivel member 188 has a sleeve portion 233 which is journaled in the arm 189. By provision of the two swivel members 188 and 230 and of the sliding connection between the shaft 192 and the bevel gear 191, angular adjustment of the swinging base 220 can readily be made while maintaining the drive to the work G. For the sake of rigidity an overhead tie or bar 235 is mounted parallel to the shaft 192. This bar may be made integral with the swivel member 230 or secured thereto in any desirable manner. It is adapted to slide in a suitably shaped recess formed between guide plates 236 and 237 (Fig. 3) which are secured to the swivel member 188.

To minimize the effect of any backlash in the train of gearing on the rotation of the work spindle 24 a brake may be provided to apply continuously a light friction load to the spindle 24. Such a brake is shown in Fig. 9 of the drawings and comprises a drum 240 which is keyed to the spindle 24 and a shoe member 241. The shoe member 241 is secured to a plunger 242 which is housed in a suitable recess in a block 243 which is secured by screws 244 to the work head 207. A coil spring 245 serves to hold the block 241, which carries a suitable braking material, against the drum 240.

In the grinding of a spiral bevel or hypoid pinion, it may be desirable to go around the gear several times to remove the desired amount of stock from the sides of the teeth. For feeding the gear into the wheel between grinds, a hand wheel 250 (Figs. 1 and 3) is provided. This handwheel is secured to an inclined shaft 251 which is suitably journaled in a bracket 252 that is secured to one side of the cradle housing 52. The shaft 251 carries a bevel gear 253 at its lower end which meshes with a bevel gear 254 that is secured to a horizontal shaft 255 which extends from one side of the cradle housing 52 to the other. Keyed to the shaft 255 is a worm 257 which meshes with the worm wheel 180 of the differential housing 173. By rotation of the handwheel 250, then, the differential housing may be rotated to rotate the work spindle 24 slightly without otherwise disturbing the timed relationship between the drives to the work spindle 24 and to the plate 108.

As has already been stated, the grinding is done during movement of the crade 37 in one direction. At the end of the generating roll of the cradle 37, the grinding wheel W is withdrawn from engagement with the work G and after return roll of the cradle 37 is completed, the grinding wheel W is moved back into engagement with the work so that on the ensuing generating roll, a new tooth surface of the gear G may be ground. The means for withdrawing the grinding wheel W from operating position and returning it to operative position again at opposite ends of the cradle movement will now be described.

Journaled in the base 20 of the machine at right angles to the shaft 109 (Figs. 4 and 10) is a shaft 260. This shaft is driven from the shaft 109. There is a bevel gear 261 (Figs. 4, 7, and 10) keyed to the shaft 109 and this bevel gear meshes with a bevel gear 262 which is keyed to the shaft 260. Keyed to the upper end of the shaft 260 is a cam 264. A roller 265 that is journaled in one end of a rod 266, engages and rides on the periphery of this cam 264. The rod 266 slides in a guide 267 which is secured to the base 20 of the machine and engages at its opposite end with one end of a hardened rod 268 which is slidably mounted in the end plate 150 of the cradle 37. The hardened rod 268 engages at its opposite end with a hardened button 270 that is secured in a lever 271.

The lever 271 is pivoted at one end by means of the pin 272 (Figs. 4 and 8) between ears 273 that are formed integral with the plate 150. At its opposite end, the lever 271 is forked to provide the furcations 275. Pins 276 are mounted in these furcations to engage in a peripheral groove 277 formed in a sleeve or spool member 278. The spool member 278 is mounted to slide on a stud 279 which is mounted in axial alignment with the stud 35. The stud 279 is mounted at one end in the stud 35 and at its opposite end in the plate 150. The spool member 278 is provided at its forward end with a recess that receives the enlarged head 280 of the rear end of the shaft 72. The head 280 is held in the recess of the spool 278 by a plate 281 so that as the spool 278 is moved axially on the stud 279, the shaft 72 is also moved axially to impart axial movement to the sleeve 27 and grinding wheel W through the nut and lug connection 74—75 between the shaft 72 and the sleeve 27.

A coil spring 285, that is interposed between a thimble 286 and a thimble 287, serves to hold the roller 265 against the periphery of the cam 264 and effects the withdrawal movements of the grinding wheel W. The thimble 286 has a pressed fit in an opening in the carrier 28. The thimble 287 threads into the spool or sleeve 278. The tension of the spring 285 can be varied by rotatably adjusting the thimble 287. The spool 278 is rotatably mounted on the stud 279 so that when the carrier 28 is adjusted angularly about the axis of stud 35 as already described, the spool will revolve on the stud 279 to maintain the thimbles 286 and 287 in alignment.

While any suitable mechanism may be employed to move the cradle 37 at a uniform velocity during grinding, the cradle-oscillating mechanism which has been illustrated and described is very simple and very flexible. It constitutes an important feature of the present invention and has, moreover, wide application since it may be used wherever it is desired to move a part at a constant speed in one direction and to effect a quick return motion in the opposite direction. The principle of construction and operation of this new quick return mechanism will now be described, therefore, in more detail.

Figure 11:
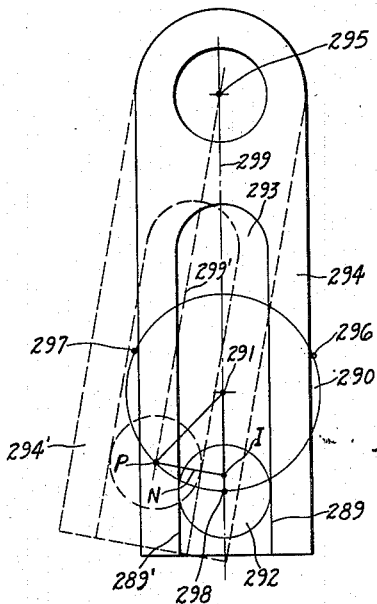
Figs. 11 and 12 are diagrammatic views illustrating, respectively, the design and principle of operation of the known Whitworth type quick return mechanism and of the quick return mechanism of the present invention.
Figure 12:
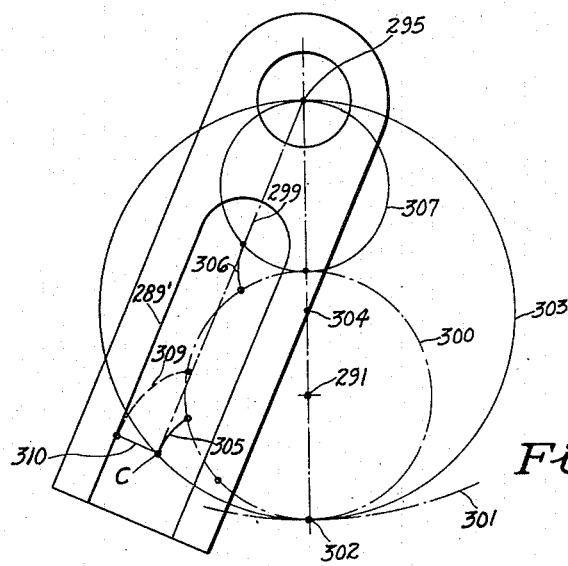

Fig. 11 illustrates the principle of operation of the known Whitworth quick return mechanism. 290 denotes a crank plate which is rotatable about an axis 291 and which carries a roller 292 that engages in a slot 293 formed in an arm 294. The slot 293 has straight, parallel sides denoted at 289 and 289', respectively. The arm 294 is mounted for pivotal movement about an axis 295. As the crank plate 290 rotates on its axis 291 an oscillatory movement will be imparted to the arm 294 about the axis 295. 296 denotes the position of the center of the roller 292 at one point of extreme swing of the arm 294, and 297 denotes the position of the center of the roller for the opposite position of extreme swing of the arm 294. It will be noted that considered in a clockwise direction, the point 296 is further from the point 297 than the point 297 is from the point 296. In other words, when the crank 290 is rotating in a clockwise direction, the arm 294 will be swung from one extremity of its travel to the other while the roller center is traveling from the position 296 to the position 297, and then the arm will be quickly returned to the original position while the roller center is moving back to the position 296.

In Fig. 11, the arm 294 is shown in full lines in a central position of its swing and in dotted lines at 294' in a position at one side of center. If the crank is rotated at a uniform velocity, the arm 294, will, of course, be moved at a variable velocity, the speed of movement being a maximum when the roller 292 is in the central position, and being slowly diminished in both directions from this central position. The instantaneous ratio of the angular velocities of the crank and the member 294 at any position P of the center of the roller 292 may be obtained by drawing through P a normal N to the center line 299' of the straight slot 293 in which the roller moves, and by locating the intersection point I of said normal with the center line 299 of the slot at the mean position of swing of the arm 294. The instantaneous ratio is then equal to the distance $$\frac{I-295}{I-291}$$

As stated, the motion imparted to the arm 294 by the crank 290 is a motion at a varying velocity. For the purposes of the grinding process of the present invention it is preferred to rotate the work continuously at a uniform velocity. It becomes necessary, therefore, to move the cradle at a uniform velocity during grinding in order to generate the profiles on the gear teeth of the correct curvature to be conjugate to the teeth of the crown gear. I have discovered that by a slight modification of the Whitworth mechanism illustrated in Fig. 11, motion at a uniform velocity in one direction can be obtained while retaining the quick return feature of the Whitworth mechanism. For this purpose, a cam 130 (Fig. 6) of suitable shape may be substituted for the roller 292. To obtain uniform motion, the cam profile must be conjugate to the straight sides of the slot in which the cam is to operate. The relative motion required is as though a gear having its axis at 291 and pitch circle at 300 were rolling internally on a gear whose axis was at 295 and whose pitch circle was at 301.

Let us first determine the curve conjugate to the straight center line 299 of the slot. As well known, any point of contact C between the required cam profile and the center line 299 may be determined as the projection of instantaneous axis 302 of motion between the pitch circles 300 and 301 to the given profile of the line 299. Since this profile is straight and radial of the cam center 295, the various points of contact C will constitute a line of action 303 which is of circular shape. The circle 303 is centered at 304 on the line connecting the centers 295 and 291 and the circle passes through the point 295 and through instantaneous axis 302. The curve required, then, is a cycloid 305 having a rolling circle 303 which rolls internally on pitch circle 300.

I have found that the cycloid 305 of circle 303 is equal to the cycloid 306 corresponding to rolling circle 307 whose diameter is equal to the difference between the diameter of the circle 303 and the diameter of the circle 300.

Since the periphery of the cam does not engage the center line of the slot, but instead engages the straight sides of the slot which are parallel to the center line, the actual cam profile is a curve 309 having a constant distance 310 from the cycloid 305 equal to half the width of the slot.

From the preceding it will be seen that if we mount a cam having a cycloidal shape, instead of a circular roller 292, upon the crank-plate we may impart uniform motion to a member having a slot whose sides are straight. For the purposes of oscillating the cradle of the grinding machine of the present invention, then, we may employ a cam 130 having a cycloidal shape around a part of its periphery to impart uniform motion to the cradle during grinding. The cam periphery will then be shaped additionally to effect reversal, when the wheel is clear of the work. The return movement of the cradle may be effected with the cycloidal portion of the cam surface, which will mean a quick return at a uniform motion, and the reversing part of the cam surface will again come into action at the end of the return stroke.

Figure 13:
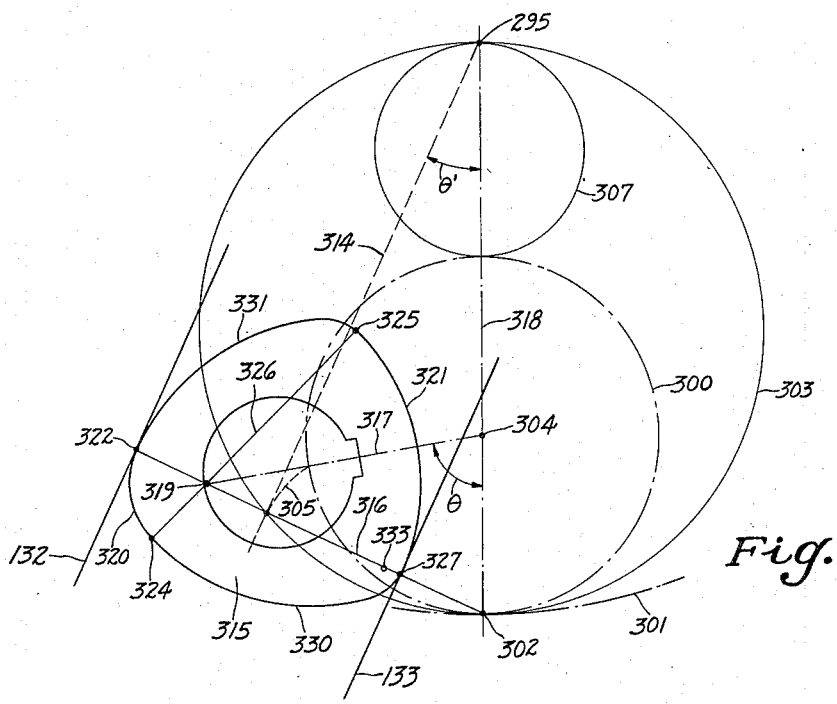
Fig. 13 is a diagrammatic view further illustrating the design and principle of operation of the quick return mechanism of the present invention.

A typical complete cam outline is shown at 315 in Fig. 13 in engagement with the straight sided guides 132 and 133 (Fig. 5) of the plate which is secured to the cradle. Here the axis of swing 295 corresponds to the axis of the cradle and the axis 304 about which the cam rotates corresponds to the axis of plate 108 (Fig. 6). In Fig. 13, a cam 315 is shown that is capable of imparting to the cradle an oscillating movement at a uniform motion through an angle of 50°. 314 denotes the position the center line of the slot, which is bounded by the guides 132 and 133, at one end of the roll of the cradle. 318 denotes the position of the center line of this slot at the center of the roll. The angle $\theta'$ between the lines 314 and 318 is, therefore, 25°. During swing of the cradle through angle $\theta'$, the cam 315 will have rotated about its axis 291 through any suitable angle $\theta$ which in the instance shown is 80°. 317 denotes the center line of the cam for the position of the cam shown. This line is radial of the axis 304. The uniform motion of the working stroke occupies therefore 160° out of the 360° of rotation of the cam.

It will be noted that the line 316, which passes through the instantaneous center 302 and is normal to the center line 314, intersects the center line 317 of the cam in a point 319. This point is made the center of circular arcs 320 and 321 which extend between the points 322 and 324 and the points 325 and 327, respectively, of the peripheral surface of the cam 315. Line 326 is the contact normal when the turning angle is plotted on the opposite side of center line 318 at the opposite end of the throw of the cam. The two limit contact normals 316 and 326, which mark the ends of transmission of uniform motion, are symmetrical to the cam center line 317.

The circular portions 320 and 321 of the cam periphery produce deceleration and reversal at opposite ends of the swing of the cradle. The working and return strokes of the cradle are controlled by the portions 330 and 331 of the cam periphery. Both portion 330 and portion 331 are preferably cycloidal curves on the principles above set forth.

During the working stroke, the two cycloidal curves 330 and 331 are in engagement with the straight sided guides 133 and 132, respectively. Assuming that the cam is rotating about the center 304 in a counterclockwise direction, then mesh begins for the working stroke at points 322 and 327 and ends at points 325 and 324, respectively. Then deceleration and reversal take place while the circular portions 320 and 321 of the cam engage the guides 133 and 132, respectively. During this deceleration and reversal, the mesh of the cam with the guides 133 and 132, respectively, moves from point 324 to point 322 and from point 325 to point 327, respectively. Then uniform motion at a higher return speed is effected by the mesh of the cycloidal portions 330 and 331 which now engage the guides 132 and 133, respectively. Finally deceleration and reversal take place at the end of the return roll with the circular portions 321 and 320 in engagement with the guides 133 and 132, respectively. Then the cycle begins anew in the position illustrated in Fig. 3. Thus it will be seen that the points of contact between the cam and the sides of the slot move always in the same direction on the periphery of the cam.

The width of the slot 322—327 should be made large enough to leave the center of curvature 333 of the cycloidal curve at 327 inside of the cam profile. The center of curvature is the same as the center of curvature of the pure cycloid and can readily be determined.

For variations in the amount of roll of the cradle, different cams may be required. However, the whole range of work of a given machine can be covered with a limited number of cams. This may be accomplished by mounting the cams so as to be adjustable radially of the axis 291 of rotation of the cam, as shown in Fig. 6. Radial adjustment is effected by rotation of the screw-shaft 113 which threads into the slide 112 to which the cam is secured. The provision of a radial adjustment also makes it possible to keep the cams themselves small in size; so small that the center of rotation 304 (Fig. 13) of a cam may be outside of the cam outline itself.

Figure 14:
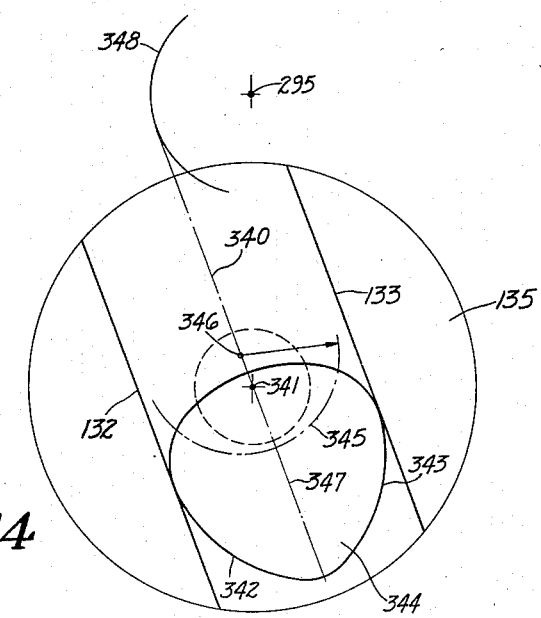
Fig. 14 is a diagrammatic view showing how the quick return mechanism may be adjusted to control the tooth bearing of a gear which is to be ground.

In my co-pending U. S. patent application, Serial No. 305,531, filed November 21, 1939, I have disclosed how a modification in the ratio of the cradle movement to the work rotation during generation may be employed with advantage in the production of spiral bevel and hypoid gears. It enables "Formate" pinions to be produced on a machine in which the axis of the tool spindle is parallel to the axis of the cradle and makes possible complete control of tooth bearing or contact. Such a modification may be obtained very simply with the cradle oscillating mechanism of the present invention, by adjusting the plate 135 (Fig. 5) so that the center line of the slot in which the cam engages is non-radial of the axis 295 of swing of the cradle, the amount of offset being determined by the amount of modification desired. Thus, as illustrated diagrammatically in Fig. 14, the plate 135 may be adjusted angularly about the axis 341 of the stud 136 so that the center line 340 of the slot, in which the cam engages, is offset from the axis 295 of swing of the cradle, that is, is tangent to a circle 348 circumscribed about the axis 295 of the cradle. The cam 344 which controls the oscillation of the cradle has a peripheral surface that includes the cycloidal curve portions 342 and 343. The cycloidal curves 342 and 343 correspond to a pitch circle 345 whose center is at 346 and may be offset from the center 341. By using various offsets of the centers 346 and 341 and various angular adjustments of the plate 135, complete control of the modification may be obtained.

The number of teeth N through which the blank rotates between successive grinding operations depends upon the angular distance through which the gear must be rotated during grinding to fully generate a tooth surface of the gear for its full length. This angle may be determined by adding the angle required to generate a tooth profile of the gear to the angle required to roll out the whole length of the spiral tooth. It is equal in other words to the pitch line overlap (or face advance of the gear teeth) plus the arc of profile action. The sum $n'$ thus obtained characterizes the total duration of contact. This may be either a fractional or an integral number of teeth. The number of teeth $n_1$ through which the blank must be rotated per cycle is now obtained by multiplying $n'$ by the ratio of a full crank turn of 360° to the useful portion of the crank rotation which in the instance illustrated is 160°.

$$\frac{360}{160} = \frac{9}{4}$$

Then $n_1 = 2.25\ n'$. N is equal, then, to the nearest integral number which is equal to or larger than $n_1$ and prime to the number of teeth in the gear to be ground. Thus, if on a nine tooth pinion $n'$ is equal to 3.5, we find $n_1 = 2.25.n' = 7.88$. N is then equal to eight teeth, for 8 is prime to 9. A ten tooth pinion would have to be indexed through N=9 teeth, for eight would not be prime to 10.

The required ratio between the turning motion of the work and of the cradle during grinding is determined in the usual manner. It is determined by the ratio of the number of teeth in the gear which is to be ground to the number of teeth in the crown gear or other basic gear to which the gear that is being ground, is to be generated conjugate.

The operation of the grinding machine described will be understood from the preceding description but may briefly be summed up here.

The operator first adjusts, of course, the grinding wheel and work into the correct operative relation. Thus, the work head 207 is adjusted to the required position on the column 210 to have the axis of the work spindle intersect or be offset from the axis of the cradle; the column 210 is adjusted on the swinging base 220 in accordance with the cone distance of the gear to be ground; the swinging base 220 is adjusted angularly on the sliding base 224 in accordance with the root angle setting of the work which is required; and the carrier 28 is adjusted angularly in the cradle 37 by rotation of the shaft 40 and worm shaft 43 (Fig. 3), and the cradle 37 is adjusted angularly with reference to the ring member 138 by rotation of the shaft 145 and spur pinion 146 (Fig. 5) to adjust the grinding wheel in accordance with the spiral angle of the gear which is to be ground. A cam 130 (Fig. 6) of suitable shape to produce the desired amount of swing of the cradle 37 will also be employed and this cam will be adjusted on the plate 108 to the desired radial position. If modification of the ratio of roll is desired, the plate 135 (Fig. 5) will be adjusted angularly about the stud 136 to offset the slot, in which the cam 130 engages, the desired amount from the axis of the cradle.

The offset adjustment of the work head 207 (Figs. 1 and 9) on the column 210 serves not only to permit grinding hypoid pinions. It allows, in conjunction with the cam 130, the radial adjustment of the cam, and the angular adjustment of the plate 135 (Fig. 5), of complete control of the bearing produced on the gear to be ground.

When all of the required adjustments have been made, the machine may be started by starting the motors 80 and 90 (Fig. 10). The motor 80 drives the grinding wheel W continuously during operation of the machine through the pulleys 82 and 83 and the connecting belt 85. The motor 90 drives the work spindle 24, the crank plate 108 and the cam 264 continuously, during operation of the machine, through the gearing which has already been described and which is illustrated in Fig. 10. As the crank plate 108 rotates, carrying the cam 130 with it, the cam oscillates the ring member 138 through its engagement with the straight sided guide members 132 and 133 of the plate 135 (Fig. 5) which is secured to the ring member 138. Thus, an oscillating motion is imparted to the cradle 37 which is connected to the ring member 138. This oscillating motion is at a uniform velocity during grinding because of the shape of the cam 130. As the cradle thus moves at a uniform velocity in one direction, the grinding wheel will grind correct tooth profiles on the continuously rotating blank. At the end of the grinding movement of the cradle, the cam 264, which has been operating to hold the grinding wheel in full depth position during grinding, permits the spring 285 (Fig. 4) to move the spool 278 rearwardly to withdraw the grinding wheel W from operative position. Then the cam 130 and the crank plate 110 operate to return the cradle at high speed. During the return movement of the cradle, the grinding wheel is held in withdrawn position and the blank continues to rotate on at its uniform velocity. The continuous rotation of the blank operates to automatically index the blank. After the return movement of the cradle 37 has been completed, the grinding wheel W is moved back into engagement with the blank G by operation of the cam 264, plunger 266, rod 268, lever 271, spool 278, shaft 72 and lug 75 (Fig. 4). Then the cam 130 and crank 110 operate again to reverse the direction of movement of the cradle and move it forward again at a uniform velocity, beginning the grinding cycle anew. When one side of all of the teeth of the gear have been ground, the cam 350 (Fig. 4), which is secured to the shaft 260 and which operates an automatic stop mechanism of any suitable construction (not shown), stops the machine. Then the gear may be set over relative to the wheel to grind the opposite sides of the teeth and the machine may be restarted. When the opposite sides of all the teeth have been ground, the machine will again stop automatically and the gear will be completed. The sliding base 224 may then be withdrawn and the completed gear taken off and a new gear chucked on the work spindle.

While the invention has been described particularly in connection with a machine for grinding spiral bevel and hypoid gears, it will be understood that the invention is equally applicable to machines for cutting such gears. Thus the machine described may be adapted for the cutting of spiral bevel and hypoid gears and pinions by simply substituting for the grinding wheel W, a standard type of face-mill gear cutter. In certain aspects, also, the invention applies to the manufacture of straight tooth bevel gears. In general it may be said that while the invention has been described in connection with a particular embodiment thereof, the invention is capable of various further modifications. The present application is intended to cover any variations, uses, or adaptations of the invention following, in general, the principles of the invention and including such departures from the present disclosure as come within known or customary practice in the art to which the invention pertains and as may be applied to the essential features hereinbefore set forth and as fall within the scope of the invention or the limits of the appended claims.

Having thus described my invention, what I claim is:

1. The method of producing a gear which comprises rotating an annular grinding wheel continuously on its axis while rotating the gear continuously on its axis and effecting relative translatory movement between the wheel and the gear alternately in opposite directions, the wheel being in operative engagement with the gear on each translatory movement in one direction, the translatory movement in the described direction being timed to the work rotation to enable the wheel to generate the gear profiles, and the wheel being out of operative relation with the work on each translatory movement in the opposite direction to permit the continuous rotation of the gear to index the gear automatically.

2. The method of producing a gear which comprises imparting cutting movements to a tool while rotating the work continuously on its axis and effecting relative translatory movements between the tool and work alternately in opposite directions about an axis angularly disposed to the work axis, and producing alternate relative movements of feed and withdrawal between the tool and gear so that the tool is in engagement with the gear during the relative translatory movements in one direction and is out of engagement with the gear during the relative translatory movements in the opposite direction, the relative translatory movements in the first described direction being timed to the gear rotation to permit generation of the tooth profiles of the gear, and the continuous rotation of the gear operating, during the return translatory movements, to index the gear automatically.

3. The method of producing a gear which comprises rotating an annular tool continuously on its axis at a uniform velocity while rotating the gear continuously on its axis at a uniform velocity, effecting relative translatory movements between the tool and gear alternately in opposite directions, and producing alternate relative movements of feed and withdrawal between the tool and gear so that the tool is in engagement with the gear during their relative translations in one direction and is out of engagement with the gear during their relative translations in the opposite direction, the relative translatory movements in the first described direction being at a uniform velocity and being timed to the gear rotation to permit generation of the tooth profiles of the gear, and the continuous rotation of the gear operating, during the return translatory movements, to index the gear automatically.

4. The method of producing a gear which comprises imparting cutting movements to a tool while rotating the work continuously on its axis and effecting relative translatory movements between the tool and work alternately in opposite directions, the tool being in operative relation with the work on each translatory movement in one direction and each of said translatory movements in the described direction being timed to the work rotation to enable the tool to generate the tooth profiles of the gear, and the tool being out of operative relation with the work on each translatory movement in the opposite direction, the work rotation being so timed to the translatory movements that for each cycle of the translatory movements the gear rotates through a number of tooth spaces which is prime to the number of tooth spaces in the gear to be produced.

5. In a machine for producing gears, a tool support, a tool mounted thereon, a work support, a work spindle journaled in the work support, a cradle on which one of said supports is mounted, means for actuating the tool, means for rotating the work spindle continuously at a uniform velocity, means driven in time with said last named means for oscillating the cradle to impart alternate generating and return movements to the cradle, and means for producing alternate feed and withdrawal movements between the tool and work supports so that the tool is in engagement with the work during the generating movements of the cradle and the tool is out of engagement with the work during the return movements of the cradle.

6. In a machine for producing gears, a work support, a work spindle journaled in the work support, an oscillatory cradle having its axis angularly disposed to the axis of the work spindle, a tool carrier mounted in the cradle for pivotal adjustment about an axis parallel to but offset from the axis of the cradle, means for adjusting the cradle about its own axis, a tool mounted on said carrier, means for actuating the tool, means for rotating the work spindle, and means for oscillating the cradle.

7. In a machine for producing gears, a tool support, a work support, a tool mounted on the tool support, a work spindle journaled in the work support, an oscillatory cradle on which one of said supports is mounted, means for actuating the tool, means for rotating the work spindle continuously at a uniform velocity, and means for oscillating the cradle comprising a rotary plate, a cam eccentrically mounted on said plate, a member secured to the cradle having a straight-sided slot in which the cam engages and means for rotating the plate continuously at a uniform velocity in time with the means for rotating the work spindle.

8. In a machine for producing gears, a tool support, a work support, a tool mounted on the tool support, a work spindle journaled in the work support, an oscillatory cradle on which one of said supports is mounted, means for actuating the tool, means for rotating the work spindle continuously at a uniform velocity, and means for oscillating the cradle comprising a rotary plate, a cam eccentrically mounted on said plate, a member secured to the cradle having a straight sided slot in which the cam engages, and means for rotating the plate continuously at a uniform velocity in time with the means for rotating the work spindle, said cam having the portion of its periphery, which is operative during movement of the cradle in one direction, shaped to a cycloidal curve.

9. In a machine for producing gears, a tool support, a work support, a tool mounted on the tool support, a work spindle journaled in the work support, an oscillatory cradle on which one of said supports is mounted, means for actuating the tool, means for rotating the work spindle continuously at a uniform velocity, means for oscillating the cradle comprising a rotary plate, a cam eccentrically mounted on the plate, a guide member secured to the cradle for angular adjustment thereon about an axis offset from the axis of the cradle, said guide member having a straight sided slot formed thereon in which the cam engages, and said cam having the portion of its periphery, which is operative during movement of the cradle in one direction, shaped to a cycloidal curve.

10. In a machine for producing gears, an oscillatory cradle, a sleeve mounted on the cradle for reciprocation in the direction of the cradle axis, a tool spindle journaled in the sleeve with its axis parallel to the cradle axis, a rotary tool mounted thereon, a work support, a work spindle journaled in the work support, means for rotating the tool spindle continuously at a uniform velocity, means for rotating the work spindle continuously at a uniform velocity, means driven in time with the last named means for oscillating the cradle, and means driven in time with the two last named means for reciprocating the sleeve, said reciprocating means being so constructed that the tool is in operative relation with the work during oscillation of the cradle in one direction and is out of operative relation with the work during the return movement of the cradle.

11. In a machine for producing gears, a tool support, a tool mounted thereon, a work support, a work spindle journaled therein, an oscillatory cradle on which one of said supports is mounted, means for actuating the tool, means for rotating the work spindle continuously at a uniform velocity in one direction, means for alternately moving the tool into and out of operative relation with the work, means for moving the cradle at a relatively slow speed in one direction and at a relatively fast speed in the opposite direction, said means being so constructed that while the tool is in engagement with the work, the cradle moves at a relatively slow speed and at a uniform velocity.

12. In a machine for producing gears, a tool support, a tool mounted thereon, a work support, a work spindle journaled therein, an oscillatory cradle on which one of said supports is mounted, means for actuating the tool, means for rotating the work spindle continuously at a uniform velocity in one direction, and means driven in time with the last named means for oscillating the cradle to impart thereto alternate generating and return movements, said means being so constructed that the ratio of the cradle movement to the work rotation is varied during each generating movement of the cradle.

13. In a machine for producing gears, a tool support, a tool mounted thereon, a work support, a work spindle journaled therein, an oscillatory cradle on which one of said supports is mounted, means for actuating the tool, means for rotating the work spindle continuously at a uniform velocity in one direction, and means for oscillating the cradle comprising a rotary plate, a cam mounted on the plate for adjustment thereon radially of the axis of the plate, said cam having a portion of its periphery of cycloidal curvature, a guide member secured to the cradle which has a straight sided slot formed therein in which the cam engages, and means for rotating the plate continuously in one direction at a uniform velocity in time with the rotation of the work spindle.

14. In a machine for producing gears, an oscillatory cradle, a tool support mounted on the cradle, a work support adjustable angularly about an axis inclined to the axis of the cradle, a work spindle journaled in the work support, a shaft, means driven from said shaft for oscillating the cradle, and means driven from said shaft for rotating the work spindle comprising a second shaft which is offset from the axis of adjustment of the work support, gearing connecting the second shaft with the work spindle, and gearing connecting the second shaft with the first shaft, said second shaft having an axially sliding connection with one set of said gearing.

15. In a machine for producing gears, a work support, a work spindle journaled therein, a tool support, a tool mounted thereon, an oscillatory cradle on which one of said supports is mounted, means for actuating the tool, means for rotating the work spindle continuously at a uniform velocity in one direction, and means for oscillating the cradle, said last named means being so driven in time with the means for rotating the work spindle that during one complete cycle of oscillation of the cradle, the work rotates through a number of tooth spaces which is prime to the total number of tooth spaces in the gear to be produced.

16. In a machine for producing gears, a work support, a work spindle journaled therein, a tool support, a tool mounted thereon, an oscillatory cradle on which one of said supports is mounted, means for actuating the tool, means for rotating the work spindle continuously at a uniform velocity in one direction, means for producing alternate feed and withdrawal movements between the tool and work, a rotary cam for controlling said feed and withdrawal movements, a rotary cam for oscillating the cradle, and means for driving said cams in timed relation with the means for rotating the work spindle and in timed relation with one another.

17. In a machine for producing gears, a tool support, a tool mounted thereon, a work support, a work spindle journaled therein, an oscillatory cradle on which one of said supports is mounted, means for actuating the tool, means for rotating the work spindle at a uniform velocity continuously in one direction, and means for oscillating the cradle comprising a rotary plate, a cam eccentrically mounted therein, a guide-member secured to the cradle and having a straight-sided slot in which the cam engages, and means for rotating the plate at a uniform velocity continuously in one direction in time with the means for rotating the work spindle, said cam being of symmetrical shape and having portions of its periphery which are of cycloidal curvature and which are connected by portions that are of circular arcuate curvature.

18. In a machine for producing gears, a tool support, a tool mounted thereon, a work support, a work head mounted on the work support, a work spindle journaled in the work head, an oscillatory cradle on which one of said supports is mounted and having an axis angularly disposed to the axis of the work spindle, means for actuating the tool, means for rotating the work spindle continuously at a uniform velocity in one direction, and means for oscillating the cradle comprising a rotary plate, a cam eccentrically mounted on said plate, a guide-member secured to said cradle and having a slot in which said cam engages, and means for rotating said plate at a uniform velocity in one direction in time with the means for rotating the work spindle, said work head being adjustable on the work support to offset the axis of the work spindle from the axis of the cradle.

19. In a machine for producing gears, a tool support, a tool mounted thereon, a work support, a work spindle journaled in the work support, an oscillatory cradle on which one of said supports is mounted, means for actuating the tool, means for rotating the work spindle continuously, and means for oscillating the cradle comprising a rotary plate, a cam mounted on the plate for adjustment radially of the axis of rotation of the plate, a guide member secured to the cradle and having a guide slot formed therein at one side of the axis of the cradle in which the cam engages, and means for rotating the plate in time with the rotation of the work spindle.

20. In a machine for producing gears, a tool support, a tool mounted thereon, a work support, a work spindle journaled in the work support, an oscillatory cradle on which one of said supports is mounted, means for actuating the tool, means for rotating the work spindle continuously, and means for oscillating the cradle comprising a rotary plate, a cam mounted on the plate for adjustment radially of the axis of rotation of the plate, a guide member secured to the cradle and having a guide slot formed therein at one side of the axis of the cradle in which the cam engages, and means for rotating the plate in time with the rotation of the work spindle, and means for imparting alternate relative movements of feed and withdrawal between the tool and the work so that the tool is in engagement with the work during movement of the cradle in one direction and the tool is out of engagement with the work during the return movement of the cradle.

21. In a machine for producing gears, a tool support, a tool mounted thereon, a work support, a work spindle journaled in the work support, an oscillatory cradle on which one of said supports is mounted, means for rotating the work spindle continuously, and means for oscillating the cradle comprising a rotary plate, a cam mounted on the plate for adjustment radially of the axis of rotation of the plate, a guide member secured to the cradle for adjustment relative to the cradle about an axis offset from the axis of the cradle and having a guide slot formed therein at one side of the axis of the cradle in which the cam engages, and means for rotating the plate in time with the rotation of the work spindle.

22. In a machine for producing gears, a tool support, a tool mounted thereon, a work support, a work spindle journaled in the work support, an oscillatory cradle in which one of said supports is mounted, means for actuating the tool, means for rotating the work spindle continuously, and means for oscillating the cradle comprising a cam, a guide member secured to the cradle at one side of the axis of the cradle and having a slot formed therein in which the cam engages, and means for rotating the cam in time with the rotation of the work spindle about an axis which lies outside of the periphery of the cam and which is parallel to the axis of the cradle.

23. In a machine for producing gears, a work support, a work spindle journaled in the work support, an oscillatory cradle, a tool support mounted on the cradle for reciprocation axially of the cradle, a tool spindle journaled in the tool support, means for rotating the work spindle continuously, means for reciprocating the tool support, and means for oscillating the cradle comprising a plate which is secured to the cradle at one side of the axis of the cradle and which has a slot formed therein, a cam engaging said slot, and means for rotating the cam in time with the rotation of the work spindle and in time with the means for reciprocating the tool support.

ERNEST WILDHABER.